(12) United States Patent
Kim

(10) Patent No.: US 8,418,922 B1
(45) Date of Patent: *Apr. 16, 2013

(54) TIME-VARYING BARCODES FOR INFORMATION EXCHANGE

(71) Applicant: Moon J. Kim, Wappingers Falls, NY (US)

(72) Inventor: Moon J. Kim, Wappingers Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,119

(22) Filed: Sep. 25, 2012

Related U.S. Application Data

(63) Continuation of application No. 13/556,737, filed on Jul. 24, 2012.

(51) Int. Cl.
*G06K 5/00* (2006.01)

(52) U.S. Cl.
USPC . 235/437; 235/375; 235/462.07; 235/462.11; 235/462.42

(58) Field of Classification Search .............. 235/437, 235/375, 462.07, 462.11, 462.42
See application file for complete search history.

(56) References Cited

U.S. PATENT DOCUMENTS

| | | | |
|---|---|---|---|
| 5,073,954 A | 12/1991 | Van Tyne et al. | |
| 5,278,397 A | 1/1994 | Barkan et al. | |
| 5,591,952 A | 1/1997 | Krichever et al. | |
| 7,273,180 B2 | 9/2007 | Zhu et al. | |
| 7,360,706 B2 | 4/2008 | Zhu et al. | |
| 8,231,054 B1 * | 7/2012 | Kim | 235/437 |
| 2006/0054695 A1 | 3/2006 | Owada | |
| 2007/0187509 A1 | 8/2007 | Kotlarsky et al. | |
| 2007/0199993 A1 | 8/2007 | Kotlarsky et al. | |
| 2008/0277475 A1 | 11/2008 | Kotlarsky et al. | |
| 2010/0020970 A1 | 1/2010 | Liu et al. | |
| 2011/0000958 A1 | 1/2011 | Herzig | |

* cited by examiner

*Primary Examiner* — Allyson Trail
(74) *Attorney, Agent, or Firm* — Darell L. Pogue; Keohane & D'Alessandro PLLC

(57) ABSTRACT

Embodiments of the present invention provide time-varying barcodes for information exchange. Specifically, embodiments of the present invention provide a system and method for communicating information between electronic devices via a time-varying barcode image sequence. In a typical embodiment, information to be transmitted is divided into packets. A barcode image is generated from each packet. Each barcode image is displayed sequentially with varying display times based on the complexity of the barcode image. A second electronic device reads and decodes the barcode image sequence until the entire information is received.

12 Claims, 4 Drawing Sheets

100A

100B

100C

100D

PACKETS

ERROR CORRECTING CODE INFORMATION

TIME-VARYING BARCODES FOR INFORMATION EXCHANGE

CROSS-REFERENCE TO RELATED APPLICATION

The instant application is a continuation of an earlier filed, co-pending application. The earlier filed application was filed on Jul. 24, 2012, has Ser. No. 13/556,737, and shares common inventorship with the instant application. Moreover, the earlier filed application was itself a continuation application of application Ser. No. 13/113,205, filed on May 23, 2011 (now U.S. Pat. No. 8,231,054 issued on Jul. 31, 2012), which also shares common inventorship with the instance application. U.S. Pat. No. 8,231,054 was a continuation-in-part (CIP) application of commonly owned and patent application Ser. No. 13/106,514, entitled TIME-VARYING BARCODE IN AN ACTIVE DISPLAY", filed on May 12, 2011 (now U.S. Pat. No. 8,256,673 issued on Sep. 4, 2012.

FIELD OF THE INVENTION

In general, the present invention relates to barcodes. Specifically, the present invention relates to time-varying barcodes for information exchange.

BACKGROUND OF THE INVENTION

A barcode is a static, optical machine-readable representation (image) of data. The bars are read by variances in reflected light. Barcode readers are relatively inexpensive and more accurate than key entry. However, issues arise when the barcode image is low resolution or has become obstructed or damaged in some way, causing a failed read or misread of the barcode information. Barcodes are also susceptible to limitations of the printer and reader. For example, barcodes printed on dark backgrounds like corrugated cardboard may be difficult to read. Heretofore, several unsuccessful attempts have been made to address these shortcomings.

U.S. Patent Application 20110000958 discloses a method and system for communicating encoded information through "animated" barcodes wherein a single bar code area on an electronics' display or television is scanned multiple times while the bar code area changes from one bar code image to another.

U.S. Patent Application 20100020970 discloses a system and method for creating a camera imaging data channel by encoding a sequence of bar codes from a display screen and captured by a camera, then decoded by software on a cell phone or similar device.

U.S. Patent Application 20060054695 discloses a dynamic bar code display apparatus that includes a storage medium and means for displaying at least two or more bar codes continuously.

U.S. Pat. No. 7,360,706 and U.S. Pat. No. 7,273,180 disclose a hand-supportable digital imaged-based bar code symbol reading device.

U.S. Pat. No. 5,591,952 discloses a bar code reader that utilizes a CCD imager device to capture the image, and the memory data from the imager device is analyzed to recognize and decode any symbols included within the image.

U.S. Pat. No. 5,278,397 discloses a multi-resolution bar code reader in which the bar code reader's optics and sensing elements are organized to send two channels of data derived from a bar code scan.

U.S. Pat. No. 5,073,954 discloses the bar code location and recognition processing system in which a bar code is optically scanned, and a digital video processor converts the scan to binary data and determines the location and pattern of the bar code in the scan image.

U.S. Patent Application 20080277475 discloses a digital image capture and processing system that combines video and snapshot image captures into a single bar code data capture cycle.

U.S. Patent Application 20070199993 and U.S. Patent Application 20070187509 disclose a hand-supportable digital bar code reader that has multiple modes of image processing capabilities that include reading both 1D and 2D bar code symbols.

None of these references, however, teach the use of an error-identifying or two-way communication feed-back loop in a dual electronic device apparatus that uses image display and image capturing devices to communicate between the devices via bar codes in at least one direction. Furthermore, none of these references teach the use of bar codes that have varying sections of bar code image pattern resolution within a single bar code pattern.

SUMMARY OF THE INVENTION

In general, embodiments of the present invention provide time-varying barcodes for information exchange. Specifically, embodiments of the present invention provide a system and method for communicating information between electronic devices via a time-varying barcode image sequence. In a typical embodiment, information to be transmitted is divided into packets. A barcode image is generated from each packet. Each barcode image is displayed sequentially with varying display times based on the complexity of the barcode image. A second electronic device reads and decodes the barcode image sequence until the entire information is received.

A first aspect of the present invention provides a data communication system for communicating information between electronic devices via a time-varying barcode, said system comprising: a first electronic device, comprising: a display screen; a display component configured to display a barcode image sequence on the display screen of the first electronic device; a second electronic device, comprising: a reader component configured to read the barcode image sequence; and a barcode decoding component configured to decode the barcode image sequence.

A second aspect of the present invention provides a method for communicating information between electronic devices via a time-varying barcode, comprising: displaying a barcode image sequence on the display screen of a first electronic device; reading the barcode image sequence by a camera of a second electronic device; and decoding the barcode image sequence by the second electronic device.

A third aspect of the present invention provides a method for providing a data communication system for communicating information between electronic devices via a time-varying barcode, said system comprising: providing a first electronic device, comprising: a display screen; a display component configured to display a barcode image sequence on the display screen of the first electronic device; providing a second electronic device, comprising: a reader component configured to read the barcode image sequence; and a barcode decoding component configured to decode the barcode image sequence.

BRIEF DESCRIPTION OF THE DRAWINGS

These and other features of this invention will be more readily understood from the following detailed description of the various aspects of the invention taken in conjunction with the accompanying drawings in which.

Figure 1:
FIG. 1 depicts a series of barcode images with increasing complexity.
Figure 1:
Figure 1:
Figure 1:
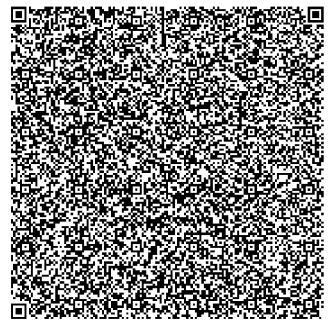

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

The barcode can be traced back to 1948, but it did not have a large impact until the 1970's when it became a tool in alleviating manual inventories. Grocery store owners began to see it as a way to save time and money in tracking product levels within the store. Throughout the 1970's, barcode scanning systems became more affordable and practical with the continued price reduction and miniaturization of barcode readers.

As indicated above, embodiments of the present invention provide time-varying barcodes for information exchange. Specifically, embodiments of the present invention provide a system and method for communicating information between electronic devices via a time-varying barcode image sequence. In a typical embodiment, information to be transmitted is divided into packets. An barcode image is generated from each packet. Each barcode image is displayed sequentially with varying display times based on the complexity of the barcode image. A second electronic device reads and decodes the barcode image sequence until the entire information is received.

FIG. 1 depicts a series of barcode images with increasing complexity. Barcode readers usually need a fairly good picture of the symbol to decode barcodes. Barcodes can store a large amount of data, but grow in size and complexity relative to the amount of data stored. Barcode image 100A is a simple barocode image. Barcode images 100B-D are increasingly more complex than the previous barcode image. The bigger and more complex the barcode, the better the picture required to decode it. The complexity and resolution of a barcode image often make it difficult to read the barcode image accurately.

Figure 2A:
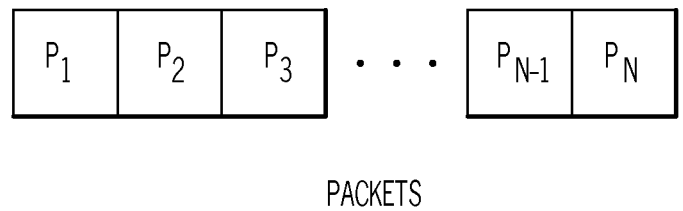
FIG. 2A depicts intended data divided into packets according to an embodiment of the present invention.

FIG. 2A depicts intended data divided into packets according to an embodiment of the present invention. The data to be communicated/transmitted is divided into packets. The size of each packet is dependent upon several factors including, but not limited to, display screen resolution, barcode image size, and data communication channel quality (i.e., the quality of the display screen and camera).

Figure 2B:
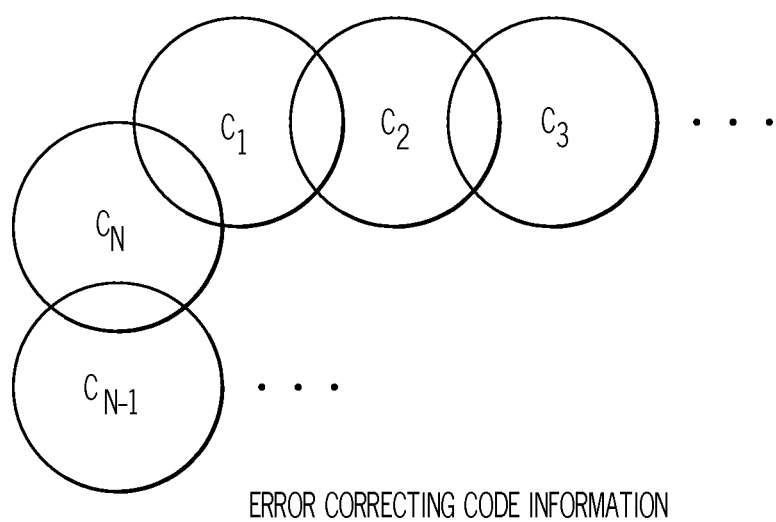
FIG. 2B depicts error correcting code information according to an embodiment of the present invention.

FIG. 2B depicts error correcting code information according to an embodiment of the present invention. Each packet has redundancy to the previous and next packet (when applicable). This means that each packet will include information from the previous and next packet (when applicable). If a packet is lost, then the missing information may be reconstructed at the receiver from the error correcting code data contained in the other packet(s), provided that the average number of consecutively lost packets is small.

Each data packet is coded as a barcode image with additional error-correcting code. For example, a barcode image is displayed on a display screen. A reader reads the barcode image. Any errors that are introduced are detected and corrected based on the remaining codes.

Figure 3:
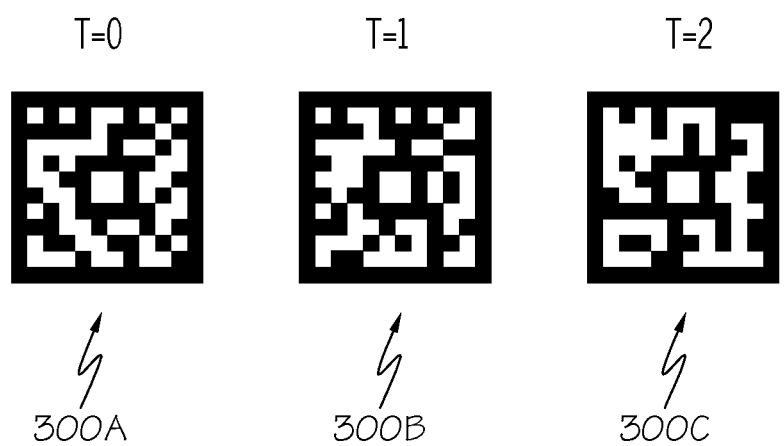
FIG. 3 depicts time-varying barcodes that are sequentially displayed according to an embodiment of the present invention.

FIG. 3 depicts time-varying codes that are sequentially displayed according to an embodiment of the present invention. The images within the barcode sequence do not have to have the same specifications (e.g., resolution, size, etc.). Each image in the sequence may have its own set of characteristics. For example, information to be communicated may be divided into three packets. Since each packet has less data, the images generated from the packets will be less complex (and thus, easier to read) than an image generated from the whole message. An image generated from the whole message would be complex and require a higher resolution. Since each packet contains only part of the whole information, the images generated from each packet may be readable by a lower resolution reader. Moreover, image code display periods do not have to be constant. More time may be given to more complex codes and less time for simpler codes.

Figure 4:
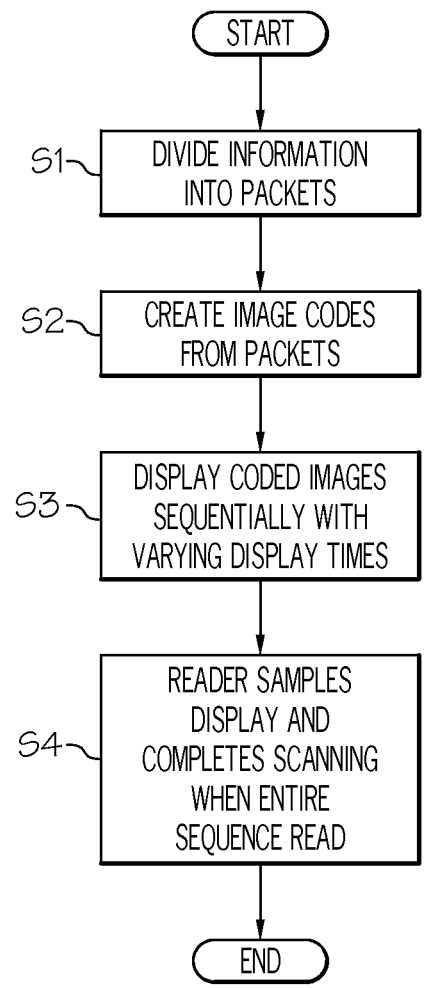
FIG. 4 depicts a process flow diagram according to an embodiment of the present invention.

FIG. 4 depicts a process flow diagram according to an embodiment of the present invention. Whole information is divided by a group of packets (step S1). Each packet is encoded into a barcode image (step S2). Each packet has redundancy to the previous and next packet. Each data packet is coded as an image with additional error-correcting code. Each barcode image is displayed sequentially with varying display times (step S3). Simple barcode images may be displayed in a short period of time, while more complex images may be displayed for longer periods of time. The reader periodically samples the display and completes scanning when the whole sequence is read and decoded (step S4).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A data communication device for communicating information via an image, said device comprising:
   a display component configured to display an image sequence or authentication graphic on a display screen of the device;
   a reader component configured to read an image sequence or authentication graphic;
   a decoding component configured to decode an image sequence; and
   a receiving component configured to receive an authentication graphic;
   wherein at least one member of the image sequence differs from the other members with respect to a display specification, and wherein the reader component is further configured to sample a display to determine when the entire image sequence is received or the authentication graphic is displayed.

2. The data communication device of claim 1, further comprising a second device comprising components to at least one of:
   display an image sequence on a display screen of the second device and recognize a return authentication graphic by a camera; and
   read an image sequence by a camera of the second device and display an authentication graphic on a display screen.

3. The data communication device of claim 2, wherein the second device further comprises:
   a display component configured to display an image sequence or authentication graphic on a display screen of the second device;
   a reader component configured to read an image sequence or authentication graphic;
   a decoding component configured to decode an image sequence; and
   a receiving component configured to receive an authentication graphic.

4. The data communication device of claim 1, wherein the image sequence and authentication graphic each comprises at least one of: a barcode, a quick response (QR) code, and a graphical image.

5. The data communication device of claim 1, wherein the display specification is the amount of time each image in the sequence is displayed, based upon the complexity of the image.

6. The data communication device of claim 1, wherein the display component further comprises an image generating component configured to generate the image sequence from the information, wherein the information is divided into a group of packets, each packet being encoded as an image, and each packet including redundancy information with respect to a different packet or error correction data information with respect to a different packet.

7. A method for providing a data communication device for communicating information via a time-varying image, comprising:
   providing an electronic device, comprising:
      a display component configured to display an image sequence or authentication graphic on a display screen of the electronic device;
      a reader component configured to read an image sequence or authentication graphic;
      a decoding component configured to decode an image sequence; and
      a receiving component configured to receive an authentication graphic;
   wherein at least one member of the image sequence differs from the other members with respect to a display specification, and wherein the reader component is further configured to sample a display to determine when the entire image sequence is received or the authentication graphic is displayed.

8. The method of claim 7, further comprising providing a second electronic device, comprising components to at least one of:
   display an image sequence on a display screen of the second device and recognize a return authentication graphic by a camera; and
   read an image sequence by a camera of the second device and display an authentication graphic on a display screen.

9. The method of claim 8, where the second device further comprises:
   a display component configured to display an image sequence or authentication graphic on a display screen of the second device;
   a reader component configured to read an image sequence or authentication graphic;
   a decoding component configured to decode an image sequence; and
   a receiving component configured to receive an authentication graphic.

10. The method of claim 7, wherein the image sequence and authentication graphic each comprises at least one of: a barcode, a quick response (QR) code, and a graphical image.

11. The method of claim 7, wherein the display specification is the amount of time each image in the sequence is displayed, based upon the complexity of the image.

12. The method of claim 7, wherein the display component further comprises an image generating component configured to generate the image sequence from the information, wherein the information is divided into a group of packets, each packet being encoded as an image, and each packet including redundancy information with respect to a different packet or error correction data information with respect to a different packet.

* * * * *